R. S. CLYMER.
VEHICLE JACK.
APPLICATION FILED NOV. 1, 1920.
1,410,376.
Patented Mar. 21, 1922.
2 SHEETS—SHEET 1.
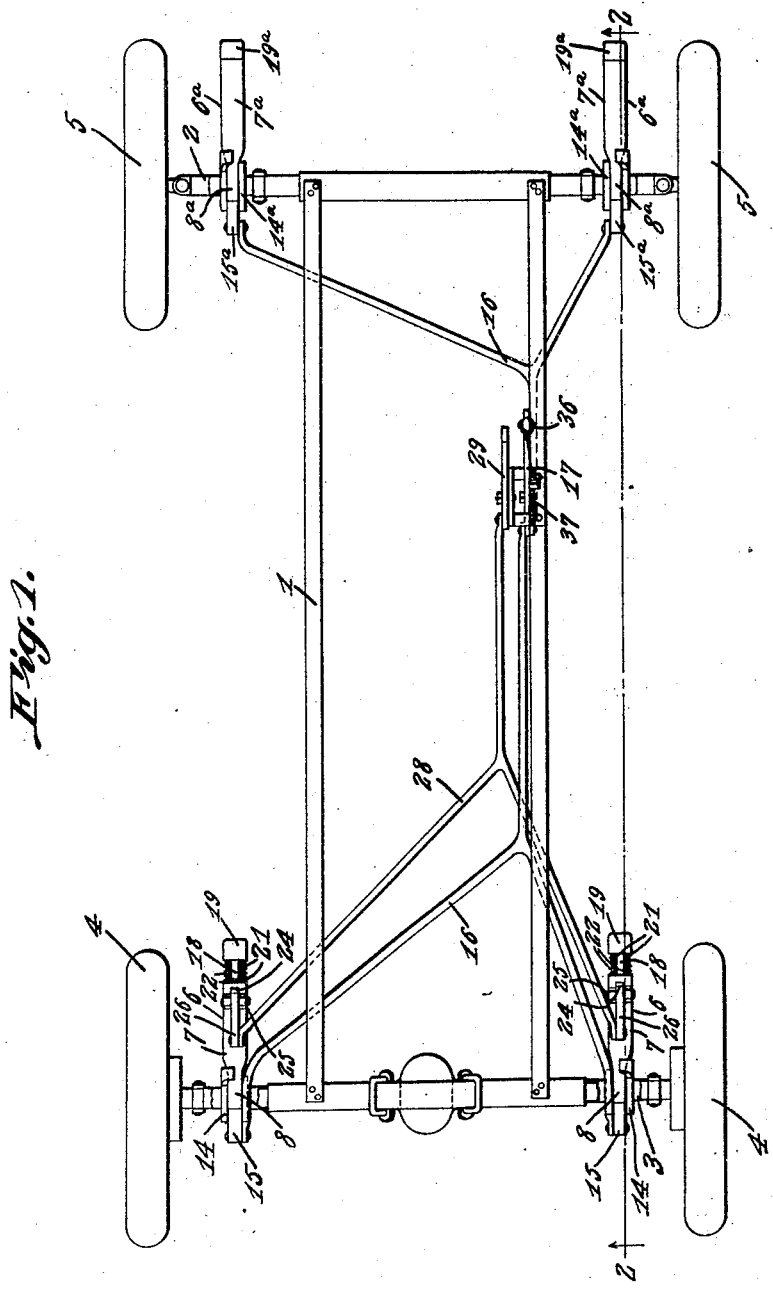
Inventor
R. S. Clymer,
By C. A. Snow & Co.
Attorneys

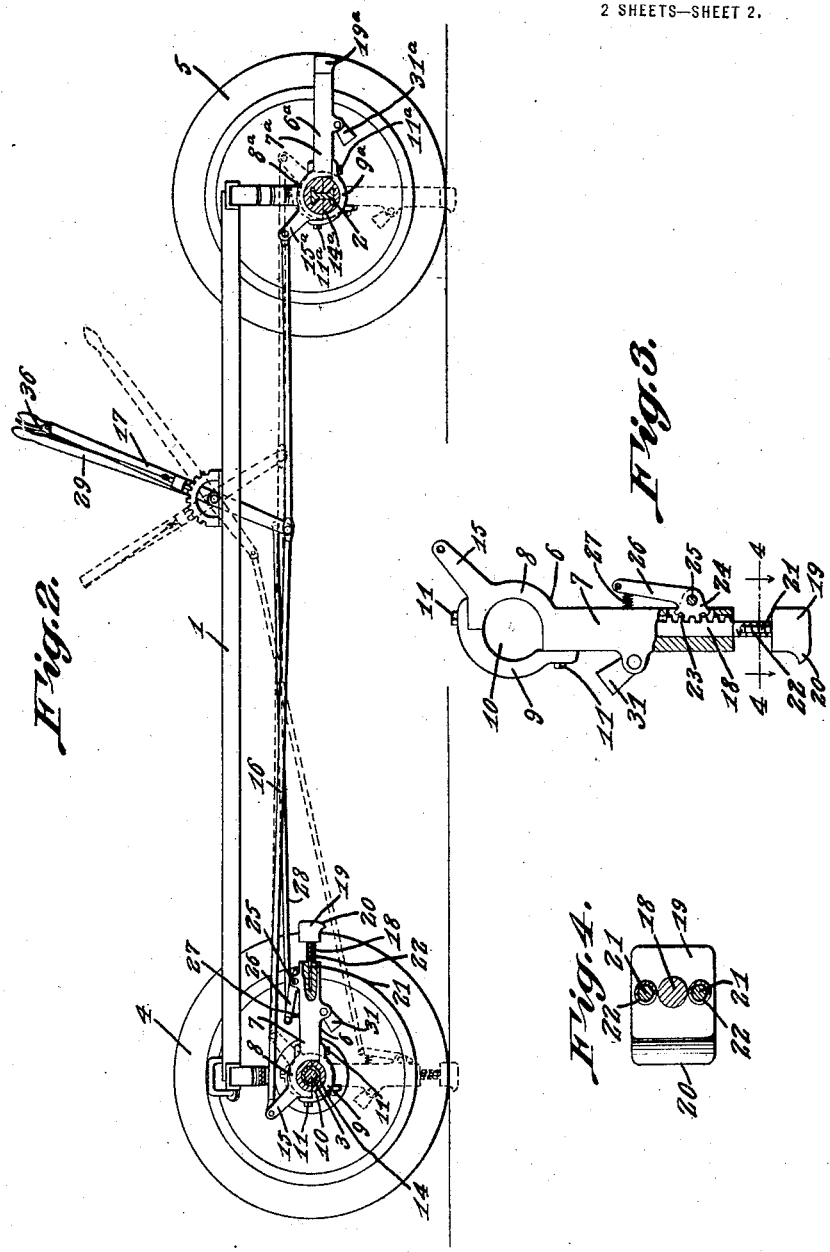

UNITED STATES PATENT OFFICE.

REUBEN S. CLYMER, OF QUAKERTOWN, PENNSYLVANIA.

VEHICLE JACK.

1,410,376.  Specification of Letters Patent.  Patented Mar. 21, 1922.

Application filed November 1, 1920. Serial No. 421,081.

*To all whom it may concern:*

Be it known that I, REUBEN S. CLYMER, a citizen of the United States, residing at Quakertown, in the county of Bucks and State of Pennsylvania, have invented a new and useful Vehicle Jack, of which the following is a specification.

This invention aims to provide novel means whereby a plurality of props pivoted to the axles of a vehicle, may be used for lifting the vehicle off the ground, due to the inertia of the vehicle, as the vehicle moves forwardly.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in top plan, a vehicle equipped with the device forming the subject matter of this application; Figure 2 is a section on the line 2—2 of Figure 1; Figure 3 is a fragmental side elevation showing one of the rear props; Figure 4 is a section on the line 4—4 of Figure 3.

The numeral 1 marks the frame of a motor propelled vehicle. The front axle is shown at 2, the rear axle at 3, the rear wheels at 4, and the front wheels at 5. A pair of rear props is provided. Each prop, denoted by the numeral 6, comprises a standard 7 having an offset portion 8 cooperating with a cap 9 to define an opening 10, the cap piece being held in place by securing elements 11. A two-part bearing 14 is mounted on the rear axle 3 and constitutes a support on which the prop 6 can swing vertically, the bearing being received in the opening 10. The portion 8 if the standard 7 carries an arm 15.

Each prop 6 is longitudinally extensible, and with this end in view, a plunger 18 is mounted to slide in the standard 7. The numeral 19 denotes a foot, beveled off at its rear, as shown at 20. The lower end of the plunger 18 has vertical sliding movement in the foot 19. The foot 19 is provided with upright guides 21 slidable in the lower end of the plunger 18, compression springs 22 surrounding the guides, the compression springs being interposed between the foot 19 and the lower end of the standard 7. As a consequence of the foregoing construction the foot 19 is yieldably mounted on the lower end of the plunger 18. The plunger 18 is provided with the rack 23 engaged with a segment 24 mounted at 25 on the standard 7 to rotate or rock thereon, the segment having an arm 26. A retractile spring 27 connects the arm 26 with the standard 7.

The props which are carried by the front axle 2 are constructed like the props on the rear axle, saving for the fact that the segments 24 and corresponding parts are omitted. In connection with the front props, parts hereinbefore described have been designated by numerals previously used, with the suffix "a."

Forked links 16 are provided, and are connected to the arms 15 of the rear props, and to the arms $15^a$ of the forward props. The links 16 are pivoted to a lever 17 mounted to swing on the frame 1 and provided with a latch mechanism 36, adapted to cooperate with a segment 37 on the frame.

A lever 29 is fulcrumed on the frame 1. A forked link 28 connects the lever 29 with the arms 26 of the segments 24 of the rear props.

In practical operation, the props 6 and $6^a$ may be swung upwardly out of contact with the ground, into an approximately horizontal position, as shown in Figure 2, the props being held thus, by engaging the latch mechanism 36 with the segment 37. When it is desired to raise the vehicle, the props 6 and $6^a$ are lowered by means of the lever 17, until the feet 19 come into contact with the ground. Then, as the vehicle moves forwardly, the props will lift the wheels 4 and 5 of the vehicle off the ground, the latch mechanism 36 being engaged with the segment 37 to hold the vehicle elevated. Since the feet 19 are supported yieldably by the compression springs 42, shocks will be avoided.

Let it be supposed that it is desired to lower the vehicle. Then the lever 29 is manipulated, the link 28 operating the segments 24, the effort of the spring 27 are overcome, and the plungers 18 and the feet 19 are moved upwardly, the rear wheels 4 coming into contact with the ground. When the rear wheels 4 are in contact with the ground, the vehicle may be backed up to cause the props 6 and 6ª to incline forwardly, to a slight extent, whereupon the props may be swung upwardly into the position of Figure 2, through the instrumentality of the lever 17.

The numerals 31 and 31ª indicate any suitable, common and well known means for operating the plungers of the jacks or props, should it be required to elevate the vehicle by the ordinary jacking operation.

Owing to the fact that the feet 19 are beveled off as shown at 20, the props 6 will tilt and permit the wheels to come into contact with the ground, when the latch mechanism 36 is released from the segment 37 and when the rear wheels 4 are started aback, as hereinbefore described.

Having thus described the invention, what is claimed is:—

1. In a device of the class described, a vehicle having an axle; a longitudinally extensible prop mounted to swing upwardly and downwardly on the axle; means accessible from a point on the vehicle for swinging the prop upwardly and downwardly on the vehicle; and means accessible from a point on the vehicle for varying the length of the prop.

2. In a device of the class described, a vehicle comprising a frame and an axle; props mounted intermediate their ends on the axle to swing thereon, each prop comprising an arm extended above the corresponding axle; a link having forks pivoted to the arms and located above the axle; and means mounted on the frame for operating the link.

3. In a device of the class described, a vehicle comprising an axle; a bearing on the axle; a prop including a part having an arm; a cap secured detachably to the prop and cooperating with said part of the prop to receive the bearing and to form a pivotal mounting for the prop; and means assembled with the arm for swinging the prop on the bearing.

In testimony that I claim the foregoing as my own, I have hereto affixed my signature in the presence of two witnesses.

REUBEN S. CLYMER.

Witnesses:
CHARLES C. BROWN,
ABRAHAM W. WITT.